R. Shaler,

Insect Trap,

Nº 22,840.    Patented Feb. 1, 1859.

Witnesses:
J. W. Gudley.
H. L. Shaler.

Inventor.
Reuben Shaler.

UNITED STATES PATENT OFFICE.

REUBEN SHALER, OF MADISON, CONNECTICUT, ASSIGNOR TO IRA W. SHALER, OF NEW YORK, N. Y.

FLY-TRAP.

Specification of Letters Patent No. 22,840, dated February 1, 1859.

*To all whom it may concern:*

Be it known that I, REUBEN SHALER, of Madison, in the county of New Haven and State of Connecticut, have invented an Improvement in Fly-Traps, the construction and operation of which I have described in the following specification and illustrated in its accompanying drawings with sufficient clearness to enable competent and skilful workmen in the arts to which it pertains or is most nearly allied to make and use my invention.

My said invention consists in the combination hereinafter described of a cover or door which closes the entrance to the upper story or chamber of the trap with a post or stop attached to the lower portion by which the attachment of the upper portion to the lower part of the trap is made to open the door or lid which otherwise closes the entrance, as hereinafter more fully set forth.

Figure 1:
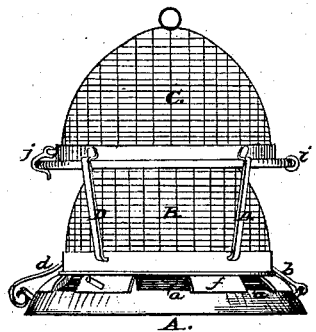
Figure 2:
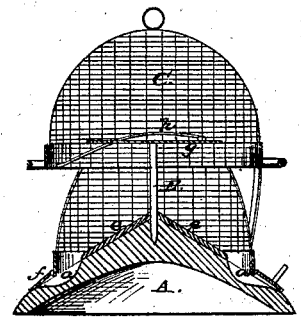
Figure 3:
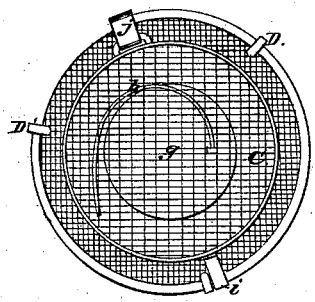
Figure 4:
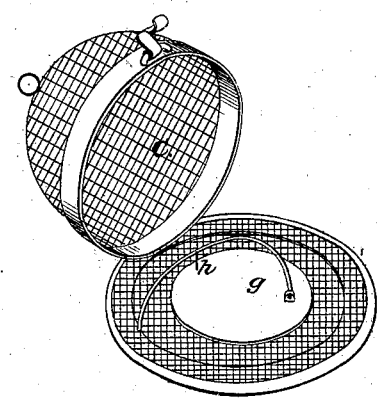

The accompanying drawings represent my invention in the following manner:

Figure 1 is a side elevation of my improved fly trap. Fig. 2 is a vertical section of it. Fig. 3 is a plan showing the upper cell and the hooks which attach it to the lower one. Fig. 4 is a perspective view of the upper cell detached and shown open.

This trap is made with a conical base, and dome-shaped chambers, the latter made of wire screening of sufficient fineness for the purpose. A is a wooden base which supports the other parts of the trap. This base is made conical as shown more particularly in Fig. 2, and has grooves or notches $a$ in it to allow the flies to enter under the rim of the lower dome or chamber B, which has an opening at the top to allow the flies to pass into the chamber or dome C above. The lower dome is attached to the base A by a hinge $b$ upon one side, and a hook $d$ or other fastening upon the other. The flies are attracted in through the openings $a$ by some sort of sweetened bait with which the cloth $e$ upon the cone A is filled or saturated. These openings $a$ may be closed either wholly or partially by means of a series of covers $f$ which are attached to a ring which encircles the pedestal A. A dome or chamber C is placed above the chamber B as shown in the drawings and is secured to it and held down upon it by hooks D as shown. The dome C is also made of wire screening and the bottom of it around the top of the lower dome is made of the same material. In the center however, or immediately over the opening at the top of the dome B a piece of glass or isinglass $g$ or other transparent substance is placed to close, or at least partially close the aperture in the top of said dome, and this cover is kept in place by a spring $h$ which when not opposed keeps the cover down so as to entirely close the opening. To keep this open however while the trap is set for operation I place a stud or post or stop E centrally in the pedestal A, which stop is of sufficient length to raise the cover $g$ far enough to allow the flies to pass when the upper chamber C is hooked down upon the chamber B. As soon however as the hooks D are released and the upper chamber raised from the lower one, the cover $g$ is closed by the spring $h$, or it might be so made as to close by its own weight though the spring is preferred as it will keep the cover closed when the basket is turned over or reversed. By this simple device the entrance to the upper chamber is kept open with perfect certainty while the trap is set for use, and yet is also closed with certainty to prevent the escape of the flies when the upper chamber is removed to carry away the flies, and that too without any motion which will necessarily disturb the flies very materially. It is obvious that the dome C may then be carried away and the flies disposed of as may be most convenient, it being remembered that the upper part of it is hung to the lower or level portion by a hinge $i$ and catch $j$ as shown, so as to allow it to be opened and the flies emptied after they have been drowned or otherwise killed or rendered powerless. By replacing this upper dome in position the entrance into it from below is opened by the stud or post E as previously described, and the trap is again set for use.

Having thus fully described my said invention and the manner in which it is to be carried into operation, the particular improvement which constitutes it, and which I claim as having been originally and first invented by me is—

The combination of the stud E and cover $g$ when arranged in connection with the chambers B and C as described for the purpose set forth.

REUBEN SHALER.

Witnesses:
S. W. DUDLEY,
H. L. SHALER.